United States Patent [19]
Lu et al.

[11] Patent Number: 6,017,477
[45] Date of Patent: *Jan. 25, 2000

[54] EXTRUSION APPARATUS AND PROCESS

[75] Inventors: Gary Lu, Granada Hills; Ganesh V. Rao, Torrance, both of Calif.; Mingchih M. Tseng, Hingham, Mass.

[73] Assignee: The Gillette Company, Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/686,208

[22] Filed: Jul. 23, 1996

[51] Int. Cl.[7] .............................. B29C 47/06; B29C 47/20
[52] U.S. Cl. ................................... 264/172.1; 264/173.17; 264/177.19; 264/237; 264/348; 264/568
[58] Field of Search ........................ 264/171.26–171.28, 264/173.17, 173.18, 177.17, 177.19, 177.1, 172.1, 237, 348, 568

[56] References Cited

U.S. PATENT DOCUMENTS

| | | | |
|---|---|---|---|
| 2,501,690 | 3/1950 | Prendergast | 264/177.1 |
| 2,994,327 | 8/1961 | Otto et al. | 132/39 |
| 3,296,661 | 1/1967 | De Moustier | 264/177.17 |
| 3,441,637 | 4/1969 | Davis et al. | 264/95 |
| 3,878,033 | 4/1975 | Zavasnik | 428/36 |
| 3,900,545 | 8/1975 | Korejwa et al. | 264/177.17 |
| 3,983,195 | 9/1976 | Arons et al. | 264/45.9 |
| 4,057,354 | 11/1977 | Bajusz et al. | 401/199 |
| 4,063,828 | 12/1977 | Mukai et al. | 264/173.17 |
| 4,087,222 | 5/1978 | Noel | 425/107 |
| 4,100,243 | 7/1978 | Wissinger et al. | 264/173.17 |
| 4,101,699 | 7/1978 | Stine | 428/36 |
| 4,146,562 | 3/1979 | Fukushima et al. | 264/45.5 |
| 4,198,363 | 4/1980 | Noel | 264/45.9 |
| 4,410,476 | 10/1983 | Redding | 264/173 |
| 4,455,133 | 6/1984 | Jakob et al. | 425/113 |
| 4,564,540 | 1/1986 | Davies et al. | 428/34 |
| 4,698,004 | 10/1987 | Rammarine | 425/131.1 |
| 4,704,244 | 11/1987 | Back | 264/566 |
| 4,756,682 | 7/1988 | Blaise | 425/113 |
| 4,789,589 | 12/1988 | Baxter | 428/317.5 |
| 4,888,192 | 12/1989 | Rammarine | 426/448 |
| 4,943,463 | 7/1990 | Back | 428/44 |
| 4,991,988 | 2/1991 | Snell et al. | 401/111 |
| 5,208,107 | 5/1993 | Yeh et al. | 428/397 |
| 5,215,691 | 6/1993 | Bland et al. | 264/45.9 |
| 5,267,846 | 12/1993 | Miyama et al. | 425/113 |
| 5,531,947 | 7/1996 | Metzger et al. | 264/173.18 |

FOREIGN PATENT DOCUMENTS

| | | | |
|---|---|---|---|
| 848870 | 8/1970 | Canada . | |
| 2162132 | 6/1973 | Germany . | |
| 3815298A1 | 11/1989 | Germany . | |
| 53-88060 | 8/1978 | Japan . | |
| 152828 | 2/1983 | Japan . | |
| 59-230726A | 12/1984 | Japan . | |
| 60-9724 | 1/1985 | Japan | 264/171.26 |
| 108598 | 4/1990 | Japan . | |
| 5-220809 | 8/1993 | Japan | 264/171.26 |
| 2098123A | 11/1982 | United Kingdom . | |
| WO 93/15917 | 8/1993 | WIPO . | |

*Primary Examiner*—Jan H. Silbaugh
*Assistant Examiner*—Mark Eashoo
*Attorney, Agent, or Firm*—Chester Cekala; Donal B. Tobin; Aubrey C. Brine

[57] ABSTRACT

Extrusion apparatus is employed in a co-extrusion process to produce a triangular-shaped barrel for a writing instrument. An inner layer of material is extruded in tubular form having a substantially circular cross-section. A coating layer of three strips of material, equally spaced one from the other, is co-extruded about the outer periphery of the inner layer. A combination of forces produced during the process is effective to distort the inner layer to form a product having a substantially triangular shape.

8 Claims, 9 Drawing Sheets

EXTRUSION APPARATUS AND PROCESS

BACKGROUND OF THE INVENTION

The present invention relates to the extrusion of elongated tubular elements, and more particularly to the manufacture of an elongated tubular element for use as a barrel in a writing instrument.

In the production of hollow elongated implements it is well known to extrude a stream of molten thermoplastic material to form the hollow profile. Extrusion processes of this type have been employed using a number of well known materials and have been successful in producing a variety of items, including the barrels for writing instruments.

It is also well known to co-extrude a plurality of layers of material to form such an item, when differing layers are required for the inner and outer surface of the item being produced.

In the manufacture of writing instrument barrels, various configurations of the external barrel surface are employed, generally in an attempt to provide a gripping surface which is more positive, and has a better "feel" to the user. Often these surfaces are formed on a cross-section which is rectilinear, such as that of a triangle, rectangle, hexagon, etc. It is also desirable, in many instances, to provide a material having a softer feel to the user as an external surface of the writing instrument barrel.

There has, therefore, been a need developed to provide a simple operation, or manufacturing process, which would produce a hollow elongated implement such as a writing instrument barrel, having a substantially rectilinear cross-section of a chosen shape by employing a plurality of materials in the process.

It is an object of the present invention to provide a process for the manufacture of a hollow elongated implement which is economical and simple to perform, and which produces a tubular element having a non-circular cross-section of substantially rectilinear form.

Another object of the invention is to provide a co-extrusion process wherein a first material is extruded to produce an elongated element circular in cross-section, and wherein the resultant product contains a plurality of distinct walls that are formed in the tubular element by the extrusion of a second material onto the first material, in accordance with the number of distinct walls required.

SUMMARY OF THE INVENTION

The above objects, and other objectives which will become apparent as the description proceeds, are accomplished by providing a process for the manufacture of a hollow elongated implement which comprises the steps of extruding the first material to produce an elongated tubular element having a circular cross-section, and simultaneously extruding a strip comprising a second material onto the outer surface of the elongated tubular element at one or more selected points, or of two or more, equally spaced about the periphery of the elongated tubular element. The element is then cooled to form a product which is tubular, having a non-circular cross-section of substantially different form than that of the originally-extruded first material.

The process may employ a first material of polypropylene and a second material of a thermoplastic elastomer.

Generally, the process is conducted having the first material extruded at a melt temperature in the area of 425° F. and the second material is extruded at a melt temperature in the area of 380° F.

The process generally includes materials of the type wherein the first material employed to produce the tubular element having a circular cross-section has a rate of shrinkage which is less than the rate of shrinkage for the second material which is extruded onto the outer surface of the element.

Due to different shrinkage rates, a differential force results between the exterior and interior surfaces of the tubular element during the cooling, and the finished product contains a plurality of distinct walls which are formed on the tubular element, each wall containing a separate strip of the second material.

BRIEF DESCRIPTION OF THE DRAWING

Reference is made to the accompanying drawing in which there is shown an illustrative embodiment of the invention from which its novel features and advantages will be apparent, wherein.

DESCRIPTION OF THE PREFERRED EMBODIMENT

Referring now to the drawing and in particular to FIGS. 1 through 10, there is shown extrusion apparatus 10 comprising a base die 11 and mandrel 12. The inner surface of the base die has a conical configuration and the facing external surface of the mandrel comprises a conical configuration of similar angularity. The die assembly 10 further consists of a coating attachment base 14, a coating attachment flow controller 15, and a coating attachment cap 16. Each of the elements of the extrusion apparatus 10 are sealingly attached, one to the other, such that flow of material through the extrusion apparatus may be retained and directed within the extrusion apparatus. The various mounting bolts, or other arrangement which may be adapted to maintain the elements of the extrusion apparatus together, have been omitted from FIG. 1, and some other figures of the drawing, in order to more adequately show the portions of the apparatus employed in the extrusion process.

Figure 1:
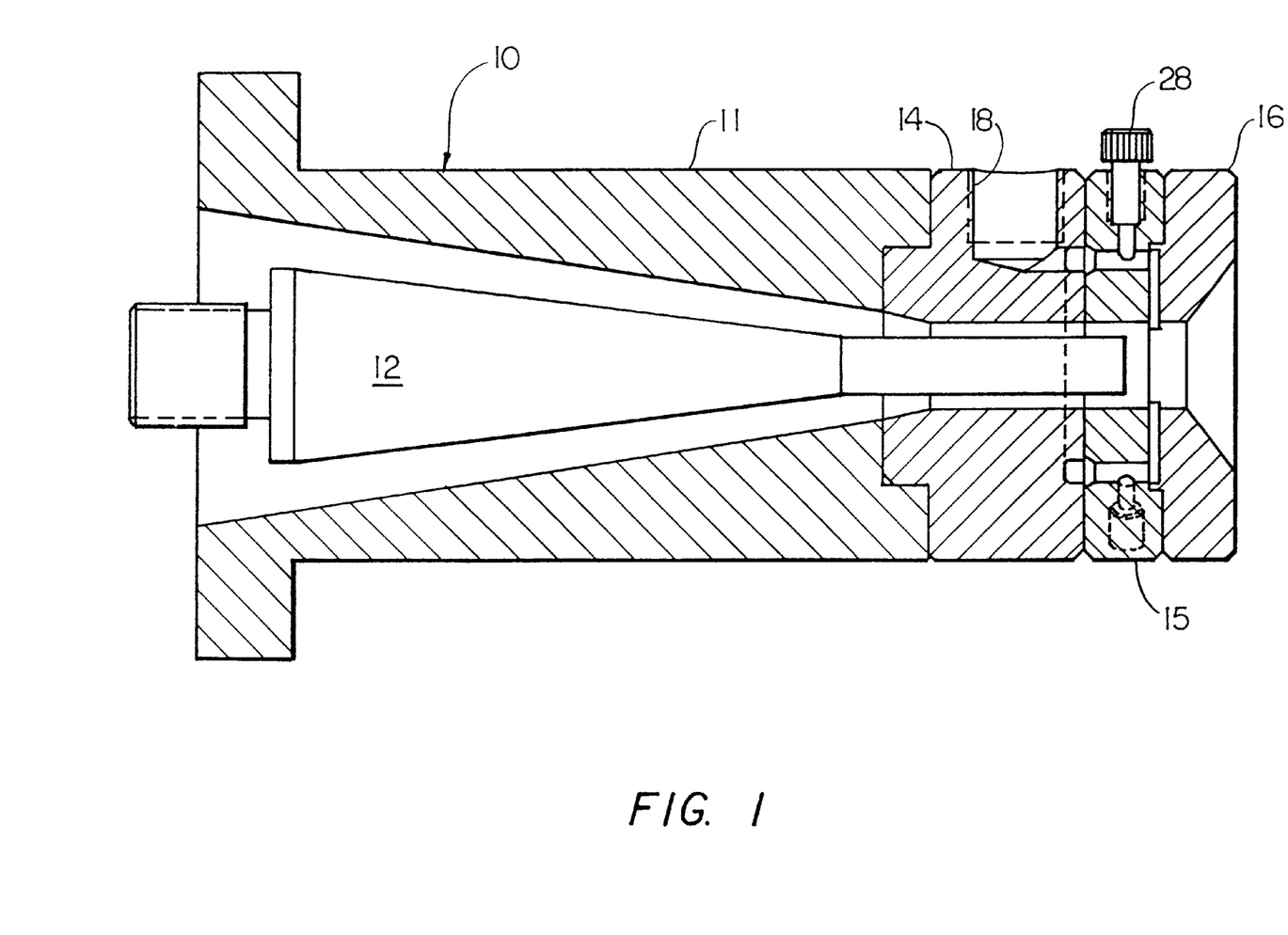
FIG. 1 is an elevational sectional view showing a portion of apparatus employed in the disclosed process for the manufacture of a writing instrument barrel.
Figure 2:
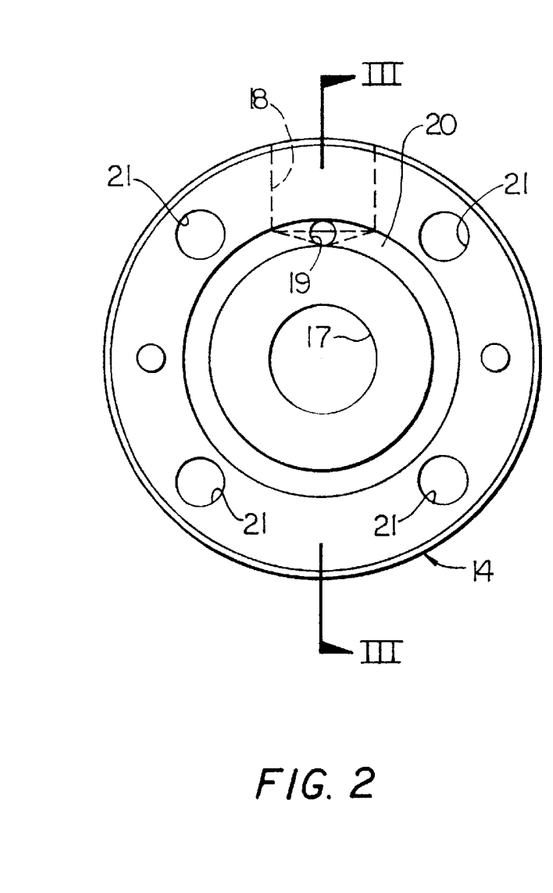
FIG. 2 is a rear elevational view showing details of an element of the structure of FIG. 1.
Figure 3:
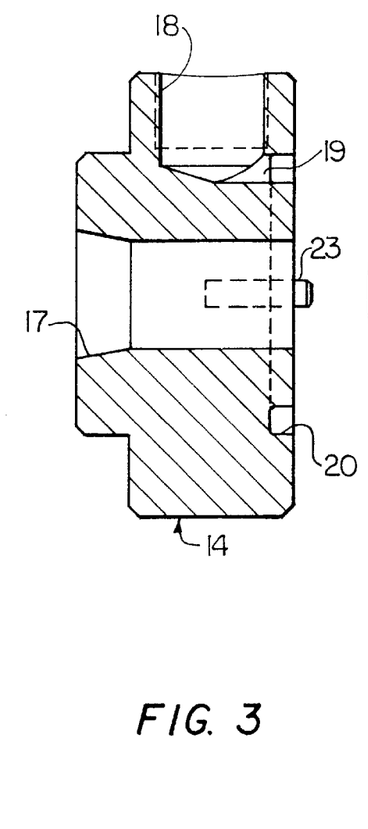
FIG. 3 is a sectional view taken along the line III—III of FIG. 2.
Figure 4:
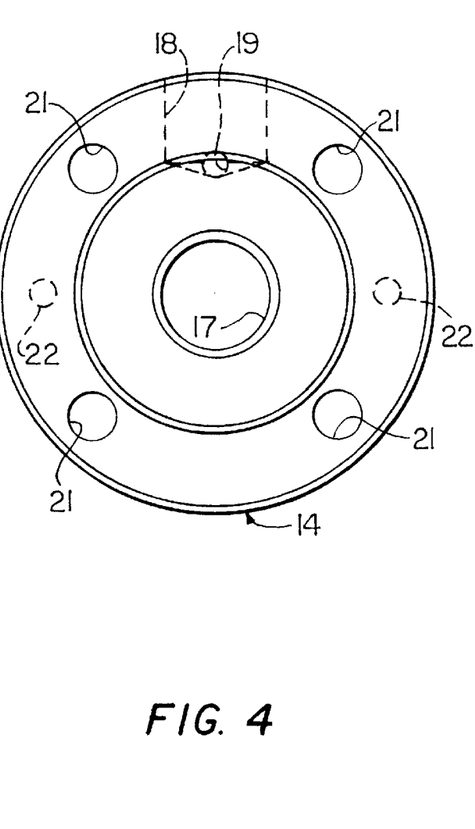
FIG. 4 is a front elevational view of the element of FIGS. 2 and 3.

Referring now to FIGS. 2, 3 and 4, the base 14 is shown to comprise a central opening 17 for accommodating the mandrel 12, and an inlet port 18 leading to a smaller diameter outlet port 19. The outlet port 19 opens into an annular groove forming a flow channel 20 and four holes 21 are provided adjacent the periphery of the base 14 for insertion of attachments (not shown) which connect the various elements of the extrusion apparatus 10, one to the other. In addition, a pair of close tolerance openings 22 are provided for receiving alignment pins 23, one of which is shown, to ensure that the flow channel 20 and the related parts of the apparatus 15 are maintained in proper alignment.

Figure 5:
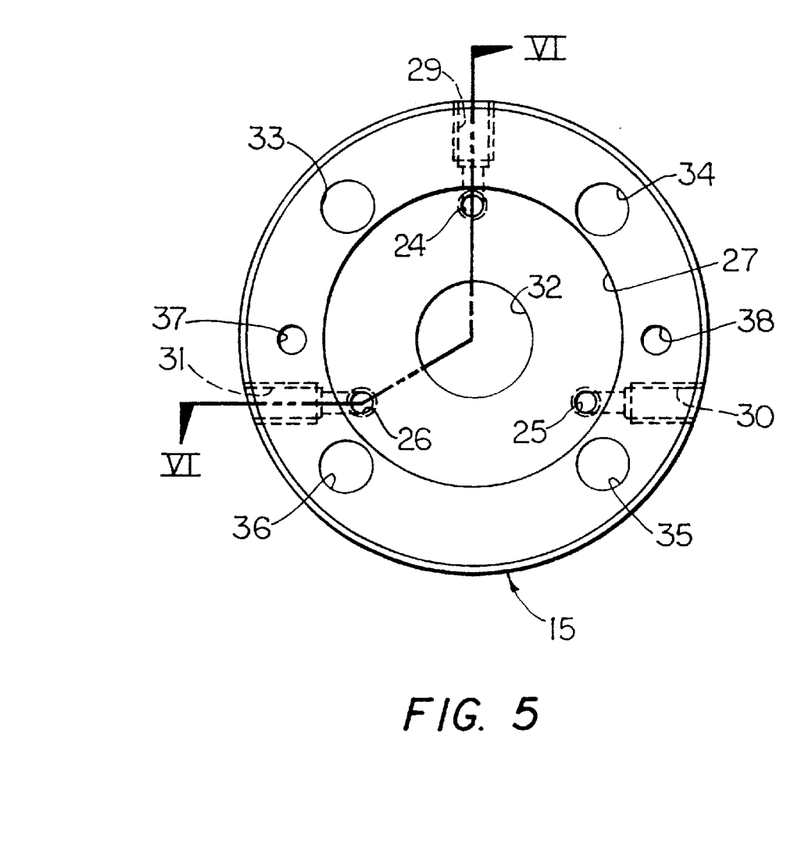
FIG. 5 is a rear elevational view showing details of another element of the structure of FIG. 1.
Figure 6:
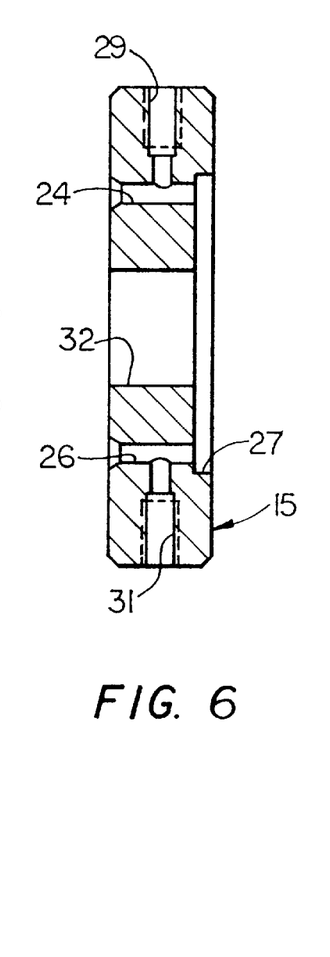
FIG. 6 is a sectional view taken along the line VI—VI of FIG. 5.
Figure 7:
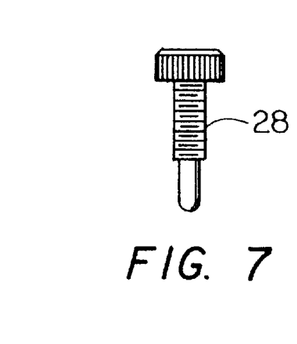
FIG. 7 is an elevational view showing a further element of the structure of FIG. 1.

Referring now to FIGS. 5, 6 and 7, the flow controller 15, which is disposed in facing relationship with the base 14, comprises three separate cylindrical flow channels 24, 25 and 26, each opening into the flow channel 20 of the base 14 and extending through the flow controller 15.

As best shown in FIG. 7, a flow control valve stem 28 is received one in each of the threaded valve bores 29, 30 and 31, and upon each rotation is effective to increase or decrease flow of material through the flow channels 24, 25 or 26. As with the base 14, the flow controller 15 is provided with a central opening 32 for receiving the forward end of the mandrel 12, and four fastener-receiving holes 33, 34, 35 and 36, and a pair of alignment openings 37 and 38 are disposed about the periphery of the flow controller 15 in mating relationship with those of the base 14.

Figure 8:
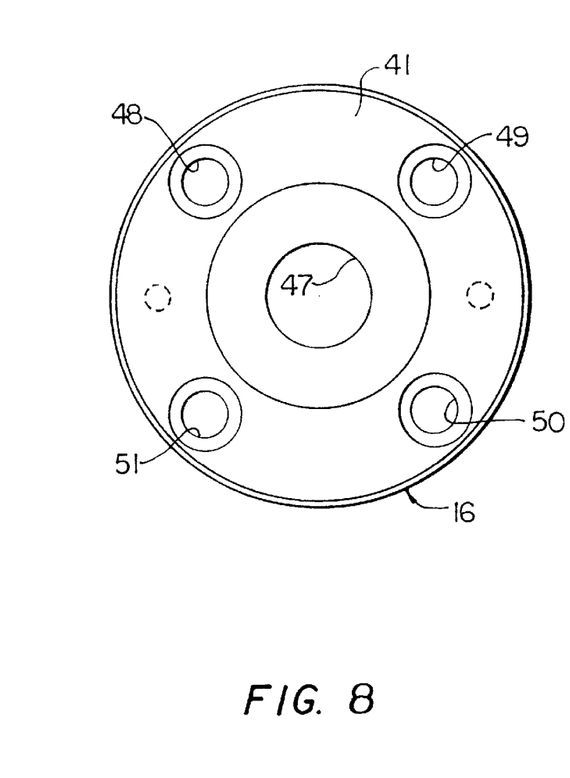
FIG. 8 is a rear elevational view showing yet another element of the structure of FIG. 1.
Figure 9:
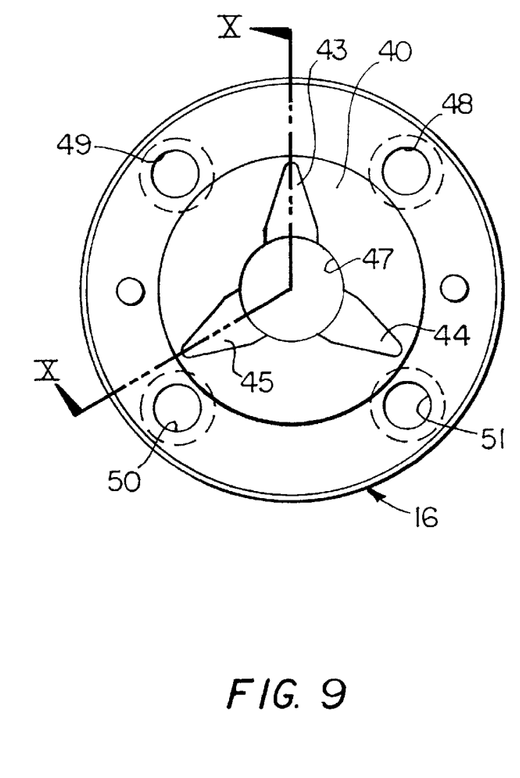
FIG. 9 is a front elevational view of the element of FIG. 8.
Figure 10:
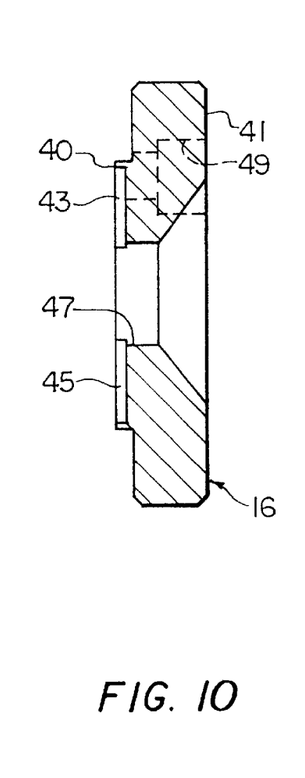
FIG. 10 is a sectional view taken along the line X—X of FIG. 9.

The cap 16, as best shown in FIGS. 8, 9 and 10, completes the assembly of the extruding apparatus 10 and is provided with a facing surface 40 contacting the flow controller 15, and an outer surface 41 through which the extruded product passes into the next production station, as will be discussed as the description proceeds.

The facing surface 40 extends into the cylindrical opening 27 of the flow controller 15 and has three flow grooves 43, 44 and 45 extending radially outwardly from the centerline of the cap 16. The flow grooves 43, 44 and 45 are substantially triangular in shape, each with its outermost area contacting a respective flow channel 24, 25 or 26 of the flow controller 15. Again, as with base 14 and flow controller 15, the cap 16 is provided with a central opening 47, four fastener-receiving holes 48, 49, 50 and 51, and a pair of alignment openings 52 and 53, enabling the extrusion apparatus 10 to be firmly assembled in proper registration with the flow channels provided.

Figure 11:
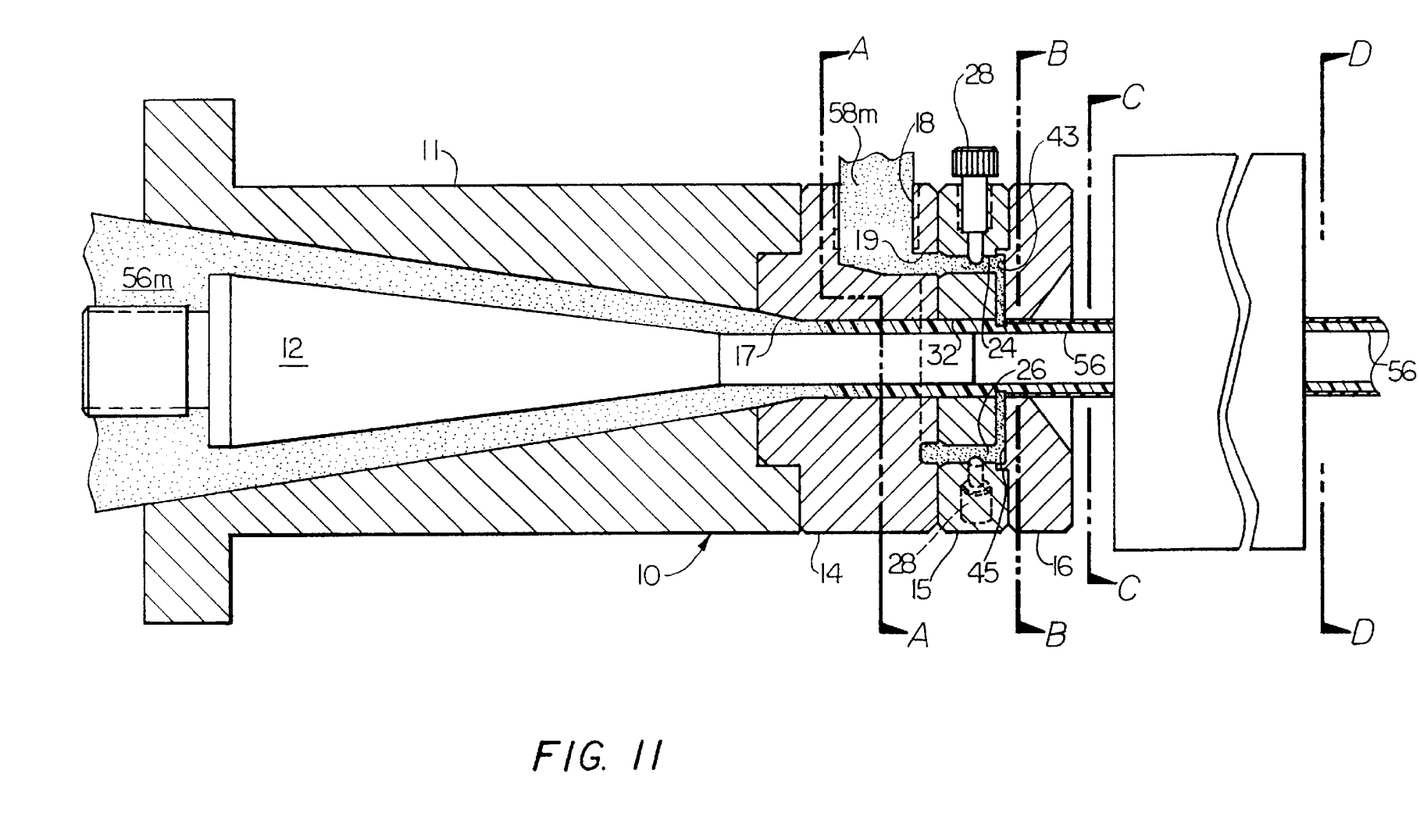
FIG. 11 is an elevational sectional view, similar to FIG. 1, showing that portion of the apparatus during the process of manufacture.
Figure 12:
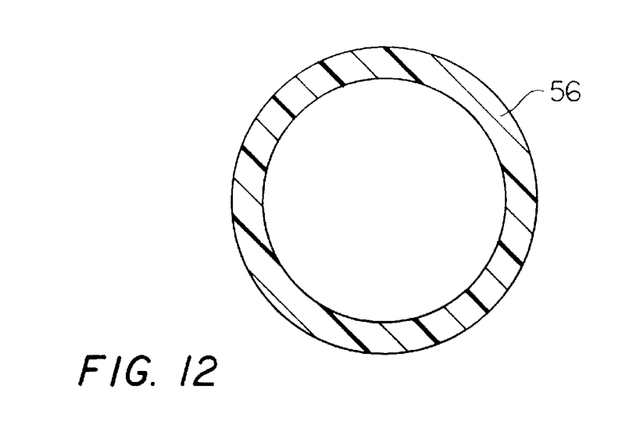
FIGS. 12 through 15 are sectional views, taken on an enlarged scale, showing an article manufactured by the apparatus of FIGS. 1 through 11 at sections A—A, B—B, C—C and D—D, respectively, during the manufacturing process, elements of the apparatus being deleted from the sections for clarity.

The process for which the extrusion apparatus 10 is constructed is best depicted in FIG. 11, wherein an inner material designated 56m, in molten form, is introduced into the extruder apparatus 10 and flows between the inner surface of the base die 11 and the outer surface of the mandrel 12. The material 56m flows through the central opening 17 in the coating attachment base 14, the central opening 32 in the flow controller 15 and the central opening 47 in the cap 16 during which it is formed into the inner cylindrical member 56.

A coating material 58m, also in molten form, is introduced into the inlet port 18 of the base 14 flowing through the outlet port 19 and into the circular flow channel 20. The material 58m then is passed through the three flow channels 24, 25 and 26 disposed in the flow controller 15, wherein the valve stems 28 have been adjusted to control flow through each of the respective channels 24, 25 and 26. Material 58m then is directed by the grooves 43, 44 and 45 formed in the cap 16 to the outer surface of the inner cylindrical member where three distinct and separate strips of material are formed onto the outer surface of the member 56.

Although the present construction provides three separate and distinct strips of material on the outer surface of the cylindrical member 56, it should be understood that by modification of the apparatus 10 herein disclosed, any number of strips of material could be formed onto the outer surface of the inner cylindrical member without departing from the spirit of the present invention.

As the present invention is directed to a structure for use as a writing instrument barrel, the outer material 58m which was chosen was Sarlink 2180 (thermoplastic rubber), manufactured by DSM Thermoplastic Elastomers, Inc., having an MFI of 192 measured by ASTM D 1238, a shrinkage of 0.020 inches per inch and a specific heat of 2400 J/Kg/°C. Materials which also may be used for the outer cylindrical member could be any thermoplastic elastomer material, such as Kraton or Santoprene manufactured by Shell Co. and Monsanto Co., respectively.

The inner material 56m was chosen as an extrusion grade polypropylene Amoco 1012, manufactured by Amoco, having an MFI of 1.2 measured by the ASTM D 1238 method, having a shrinkage of 0.014 inches per inch and a specific heat of 2800 J/Kg/°C. The inner layer also could be chosen from any semi-crystalline material, such as polyethylene.

Figure 14:
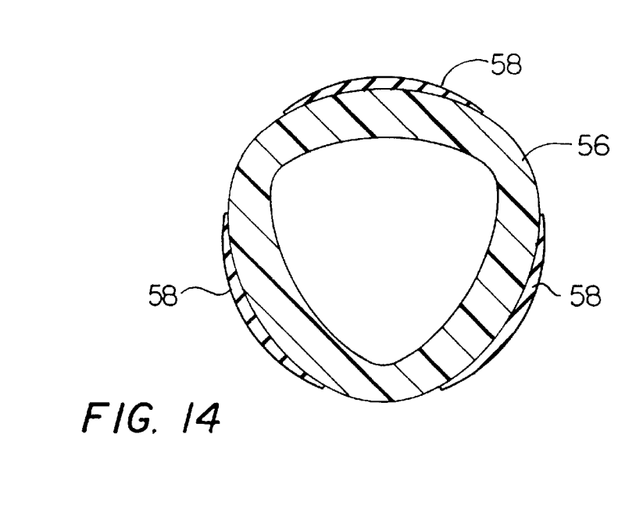
Figure 15:
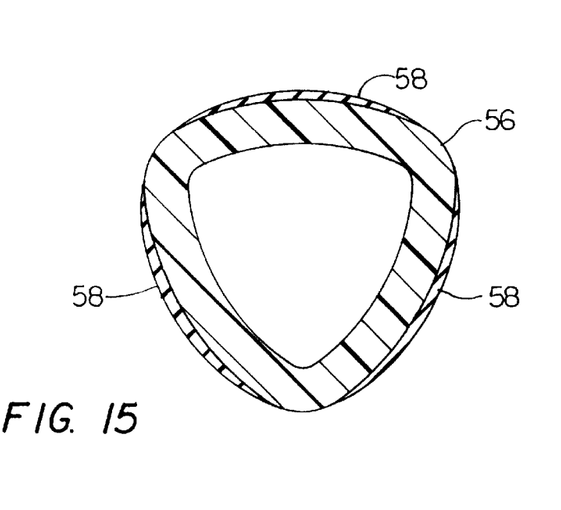
Figure 16:
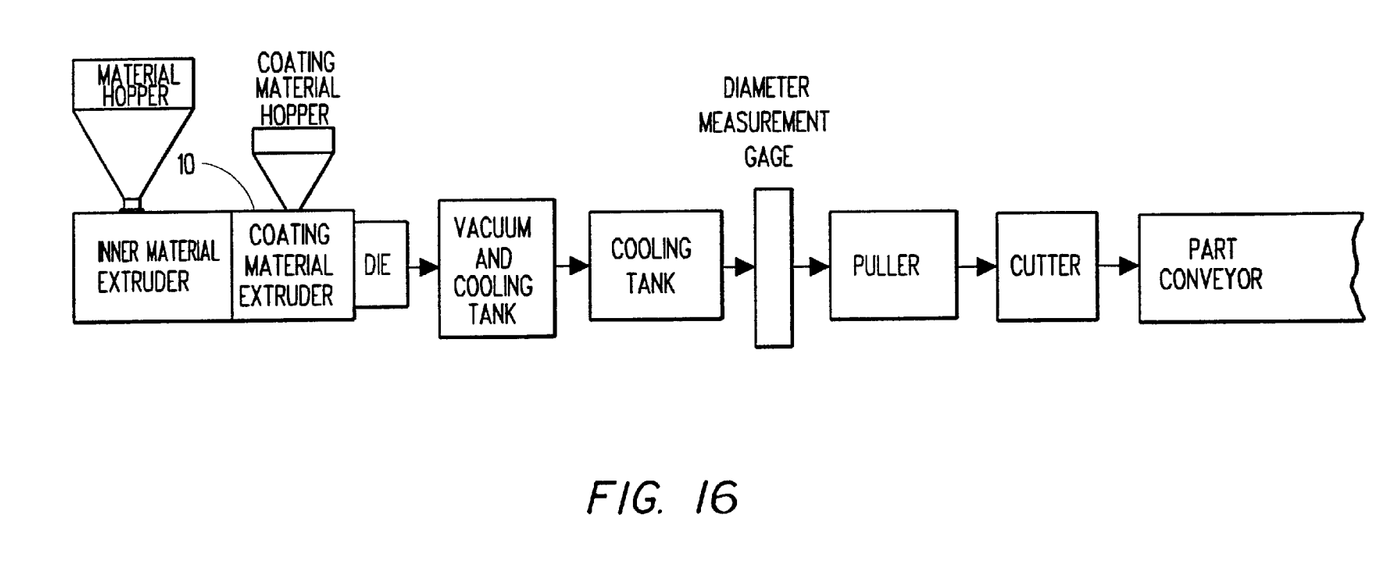
FIG. 16 is a block diagram showing the various elements employed in the manufacturing process to produce a writing instrument barrel.

Referring now to FIGS. 12 through 16, and particularly to FIG. 16, the entire process for forming the triangular shape of the finished product is shown to include, in addition to the die structure 10 described in detail, elements which are readily obtainable on the market and are well known in the extrusion art, which have been uniquely assembled to provide Applicants with the claimed results.

As shown in FIG. 16, the elements included in the production process are a vacuum cooling tank wherein the water temperature is maintained in the area of 65° F. and a second cooling tank wherein the water temperature is maintained in the area of 120° F., from which the article of manufacture is transferred through a diameter measurement gauge and into the device which is effective to pull the product through the cooling tanks and gauge and transfers it to a cutter wherein the proper size of product is severed from the continuous product. Finally, the severed elements are transferred to a part conveyor where the pen barrels, in the present instance, or other such articles of manufacture are transported to further assembly stations.

Figure 13:
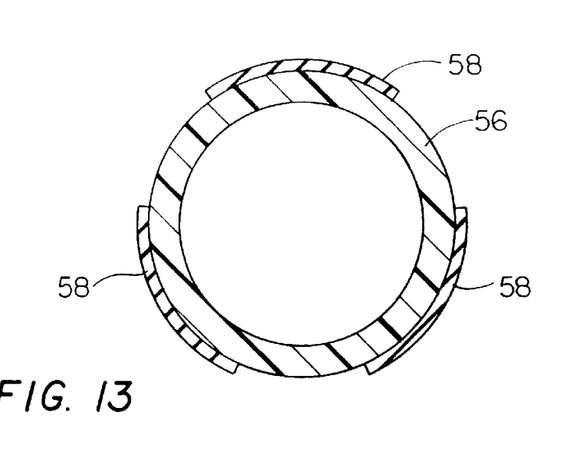

Referring back to FIGS. 12 through 15 taken in conjunction with FIG. 11, at FIG. 12 is shown the cross-section of the cylindrical element 56 at the section A—A of FIG. 11. As is evident, the combination of the base die 11 and mandrel 12 combine to produce a cylindrical product which is transferred to the position at which the section B—B is taken, at the coating attachment cap 16. At this point, the elongated strips 58 have impinged upon the inner cylindrical element 56 and are fused to the element, as shown in FIG. 13. Shortly after leaving the outermost surface of the cap 16, due to impingement force and as the materials cool, the product is formed into a configuration, as shown in FIG. 14 which is taken along the section line C—C between the exit point of the apparatus 10 and the entry to the vacuum and cooling tank as best shown in FIG. 16. The tube 56, as it enters the vacuum tank, is cooled to a solid by water and brought to size by the vacuum in the tank.

It should also be noted that air may be pumped into the tube through the die mandrel 12, all of which aids to keep the proper sizing and form of the tube.

As best shown in FIG. 15, as the cooling continues and finally, as the product exits the vacuum and cooling tank, the product has assumed a triangular shape wherein the outer strips 58 are stretched to form a feathered edge at each of the sides of a strip.

Figure 17:
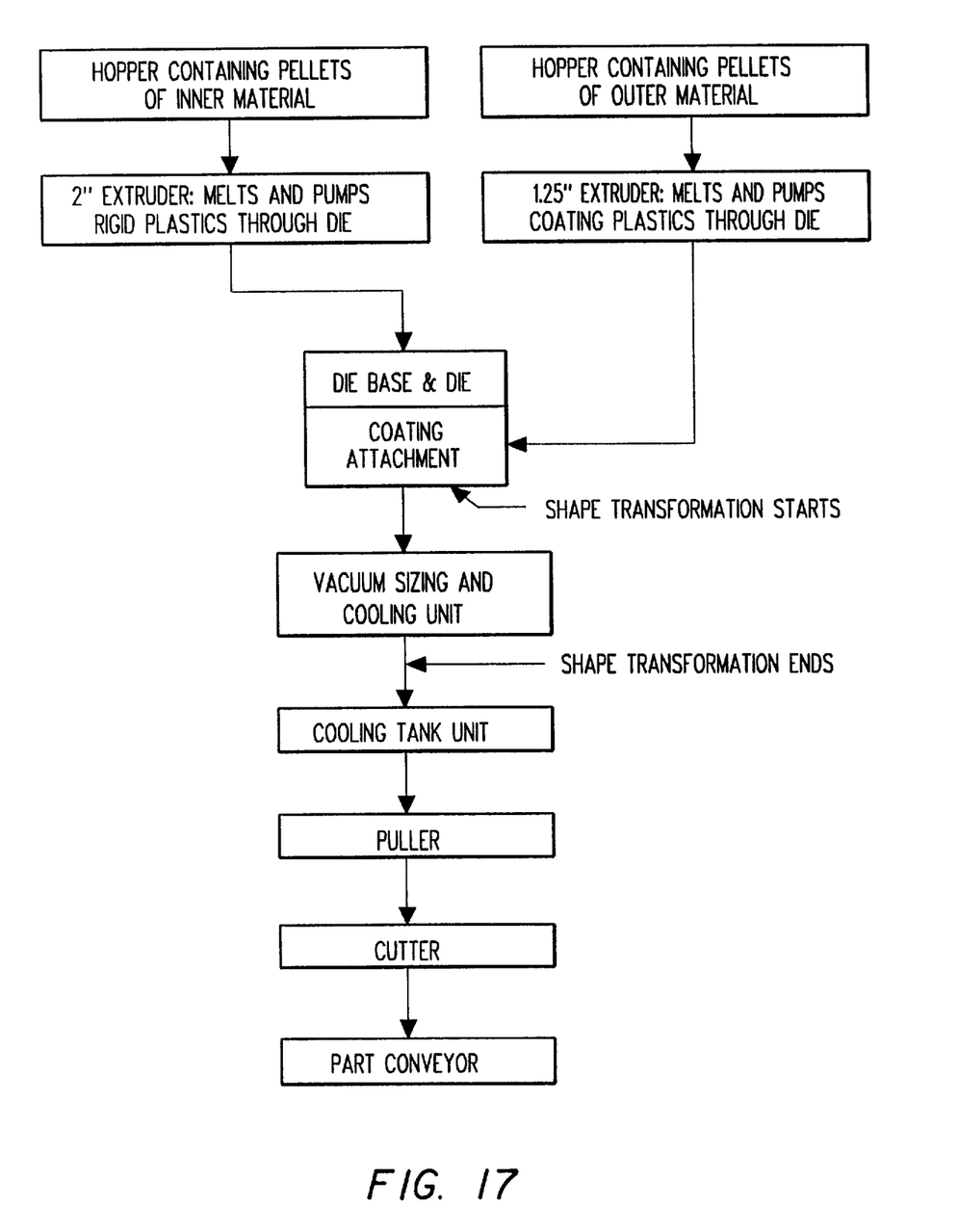
FIG. 17 is a flow chart showing the operational steps performed in the manufacturing process employing the apparatus shown in FIG. 16.

Referring now to FIG. 17, a block diagram is shown which is illustrative of the disclosed process which may be employed to produce a product of non-circular cross-section having a substantially rectilinear form of any desired number of distinct faces. In the manufacture of the product shown at FIGS. 12 through 15, at the 2 inch extruder the screw is operated at approximately 50 rpm and the extruder pressure is in the area of 1275 psi, the melt temperature being in the area of 420° F. At the 1.25 inch extruder the screw is operated at approximately 35 rpm, the extruder pressure being measured at about 1200 psi while the melt temperature is in the area of 380° F. The die pressure was measured at 840 psi and the die temperature in the area of 390–405° F.

The hot extruded tube enters the vacuum sizing and cooling unit which is maintained at approximately 65° F. after which the tube passes through the cooling tank which is maintained at a temperature of approximately 100° F.

The puller is constructed to operate at 60 fpm although the line speed may be increased without substantially affecting the tube configuration.

Referring to FIG. 13, just prior to exit from the die the cylindrical member 56 has an inner diameter of 0.290 inches and an outer diameter of 0.450 inches. The material forming the elongated strips 58 is applied to the cylindrical member in a thickness of approximately 0.010 inches.

After the soft cylindrical member 56 exits the die, the size of the member reduces due to a combination of shrinkage and drawdown (the soft member is pulled thinner by the puller). By varying the drawdown in the vacuum chamber a range of final sizes may be achieved.

In addition to varying the number of strips of outer coating, it should also be understood that by adjustment of the metering valve stems to control the amount of material in the flow controller 15, the various and distinct sides of the product could be altered as desired. Thus, the final shape of the triangle disclosed herein could be altered to produce, for instance, an isosceles triangle.

The present invention, therefore, provides a process in which extrusion apparatus 10 may be employed to extrude materials having a cross-section which may be a polygon or other figure having one, two, three, or more sides forming a non-circular configuration, as desired. The inner material in molten form is pumped into the die base, through the die and around the die mandrel, and finally through the coating attachment wherein the coating melt is pumped into preferably a plurality of streams if two or more layers are added and deposited on the outer surface of the inner molten material. The flow rate of each stream of outer molten material is controlled by a flow control valve, and each stream of melt flows through a channel to impinge upon the inner melt. When both the molten materials exit the extruder apparatus, it can be seen that the coating material is in the form of three strips on the inner tubular material and continuous along its length.

The process by which the tubular extrudate changes into a triangular or other chosen polygonal cross-section is believed to be one, or a combination of 1) the force of impingement of the coating material on the soft inner material at equally-spaced locations around the circumference of the inner melt deforming the tubular cross-section into the triangular cross-section, and/or 2) the shape distortion of the cross-section occurring during the process of cooling of the molten material into a solid tube, which is due to the difference in the amount of the shrinkage of the co-extruded materials about its circumference. The coating material generally has a different shrinkage rate than the inner material, and since the coating material coats the inner material at only a desired number of locations (three in the present disclosure) along the circumference, the combined materials shrink by a different amount in these locations than in locations where the inner material is exposed. The difference in shrinkage generally would distort the shape of the cross-section. Additionally, the total wall thickness of the tube is thicker at locations where the coating materials are present. Thicker walls tend to shrink more than thinner walls in plastics materials and this serves to complement the differential shrinkage rate which is chosen for the two materials.

Figure 18:
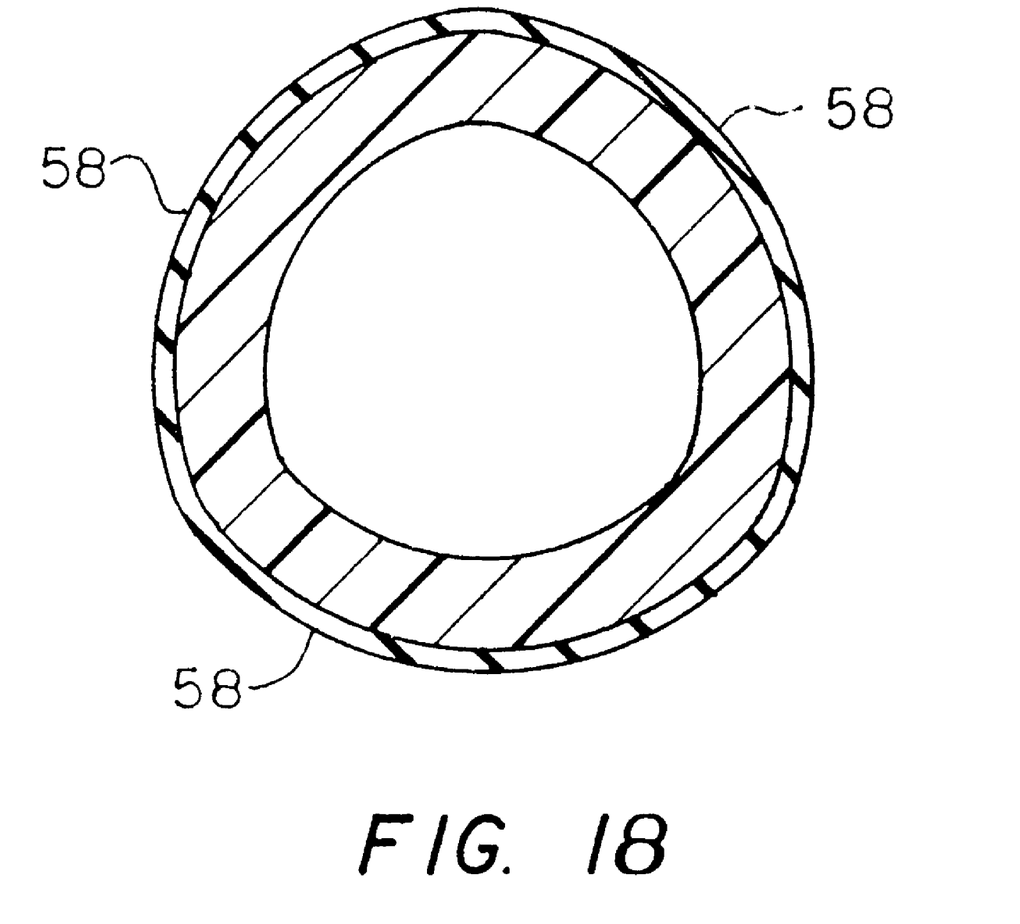
FIG. 18 shows an alternative embodiment of the present invention.

It should also be well understood that whereas discrete strips 58 are shown in FIGS. 13, 14 and 15, the strip's edge(s) of one strip may "meld" or melt together with the strip edges of an adjacent strip, such that both strips would appear as one strip or continuous surface area when viewing their now combined outer surfaces. See, for example, FIG. 18. Even when these combined strips form one continuous outer surface, they are still separate strips for the purpose of description of this invention.

While it is apparent that changes and modifications can be made within the spirit and scope of the present invention, it is our intention, however, only to be limited by the appended claims. As our invention we claim:

What is claimed is:

1. A method of manufacturing an elongated tubular element having a substantially rectilinear cross-section, which includes the steps of:

providing a first work station for extruding a first material and a second material:

extruding said first material to form an elongated tubular element having a circular cross-section and simultaneously extruding a strip comprising a second material, wherein the rate of shrinkage of said first material is different from the rate of shrinkage of said second material, onto the outer surface of said elongated tubular element at one or more selected points about the periphery of said elongated tubular element, wherein said circular cross-section of said elongated tubular element is forced to a moderately rectilinear cross-section due to the impingement force of said second material;

providing a second work station having a means for cooling said elongated tubular element; and passing said elongated tubular element through said second work station thereby cooling said elongated tubular element;

wherein said cooling, which causes distortion of said moderately rectilinear cross-section due to a differential shrinkage force between said second material and said first material of said elongated tubular element during cooling is effective to form a non-circular cross-section of substantially rectilinear form from said moderately rectilinear cross-section.

2. A process as set forth in claim 1 wherein said second material is extruded at three selected points.

3. A method of manufacture as set forth in claim 1 wherein the rate of shrinkage for said first material is less than the rate of shrinkage for said second material.

4. A method of manufacture as set forth in claim 3 wherein said first material is extruded at a melt temperature in the area of 425° F.

5. A method of manufacture as set forth in claim 4 wherein said second material is extruded at a melt temperature in the area of 380° F.

6. A method of manufacture as set forth in claim 5 wherein a plurality of distinct walls are formed in said elongated tubular element, each wall containing a separate strip of second material.

7. A method of manufacture as set forth in claim 6 wherein said first material is a polypropylene material.

8. A method of manufacture as set forth in claim 7 wherein said second material is a thermoplastic elastomer.

* * * * *